United States Patent [19]

Russell

[11] Patent Number: 4,989,465
[45] Date of Patent: Feb. 5, 1991

[54] APPARATUS AND METHODS FOR PRODUCING MOTIVE POWER

[75] Inventor: Michael S. Russell, Slough, England

[73] Assignee: Kidde-Graviner Limited, Derby, England

[21] Appl. No.: 386,282

[22] Filed: Jul. 27, 1989

[30] Foreign Application Priority Data

Aug. 9, 1988 [GB] United Kingdom ............... 8818886

[51] Int. Cl.$^5$ .............................................. G01C 19/12
[52] U.S. Cl. ......................................... 74/5.7; 60/39.75
[58] Field of Search ................. 74/5.7, 5.12; 60/39.75

[56] References Cited

U.S. PATENT DOCUMENTS

| | | | |
|---|---|---|---|
| 2,960,876 | 11/1960 | Saphra | 74/5.7 |
| 3,129,594 | 4/1964 | Hosli | 74/5.12 |
| 3,142,184 | 7/1964 | East et al. | 74/5.12 |
| 3,186,241 | 6/1965 | Blanding et al. | 74/5.12 |
| 3,267,748 | 8/1966 | Conklin | 74/5.7 X |
| 3,570,282 | 3/1971 | Knopp et al. | 74/5.12 |
| 3,999,380 | 12/1976 | Williams | 60/218 |
| 4,013,010 | 3/1977 | Schneiter et al. | 102/39 |
| 4,021,275 | 5/1977 | Kishi et al. | 280/741 X |
| 4,062,287 | 12/1977 | Millray | 102/39 |
| 4,249,673 | 2/1981 | Katoh et al. | 280/741 X |
| 4,690,007 | 9/1987 | Moles et al. | 74/5.12 |
| 4,713,101 | 12/1987 | Spring | 126/263 X |
| 4,836,255 | 6/1989 | Schneiter et al. | 149/35 |
| 4,865,667 | 9/1989 | Zeuner et al. | 149/22 |

FOREIGN PATENT DOCUMENTS

| | | |
|---|---|---|
| 0012626 | 6/1980 | European Pat. Off. . |
| 0195547 | 9/1986 | European Pat. Off. . |
| 1132779 | 11/1968 | United Kingdom . |
| 1386897 | 3/1975 | United Kingdom . |
| 1388627 | 3/1975 | United Kingdom . |
| 1542285 | 3/1979 | United Kingdom . |
| 2022712 | 12/1979 | United Kingdom . |
| 1562118 | 3/1980 | United Kingdom . |
| 2056675 | 3/1981 | United Kingdom . |

Primary Examiner—Rodney H. Bonck
Attorney, Agent, or Firm—Leydig, Voit & Mayer

[57] ABSTRACT

For spinning up a gyroscope rotor, a motive power generating unit is used which contains a pyrotechnic gas-generating substance in the form of an azide composition. When electrically ignited, it produces a jet of filtered nitrogen gas which impacts on buckets in the periphery of the rotor and spins it up to speed. The gas generating unit can be used for generating motive power for other purposes.

15 Claims, 4 Drawing Sheets

APPARATUS AND METHODS FOR PRODUCING MOTIVE POWER

BACKGROUND OF THE INVENTION

The invention relates to apparatus and methods of producing motive power.

BRIEF SUMMARY OF THE INVENTION

According to the invention, there is provided motive power generating apparatus, comprising a pyrotechnic gas-generating substance in the form of an azide composition, activating means for igniting the composition, and means responsive to the gas generated for producing a jet of gas acting in a predetermined direction.

According to the invention, there is further provided a gyroscope rotor assembly, comprising a gyroscope rotor having its periphery formed with surface interruptions of predetermined form, means mounting the rotor for rotation, a container containing a pyrotechnic gas-generating azide composition including an oxidizing agent, activating means for activating the gas generating composition to generate nitrogen gas, filtering means for filtering the generated gas, and gas jet directing means for directing a jet of the gas in such direction onto the surface interruptions in the periphery of the rotor as to rotate the rotor.

According to the invention, there is still further provided a method of generating motive power, comprising the steps of activating a pyrotechnic azide-containing gas-generating composition including an oxidising agent so as to generate nitrogen gas, filtering the gas, producing a jet of the generated gas, and directing the gas in such direction in relation to a mechanically movable member as to cause, directly or indirectly, movement in the said member.

DESCRIPTION OF THE DRAWINGS

A gyroscope rotor assembly embodying the invention, and methods according to the invention for producing motive power, will now be described, by way of example only, with reference to the accompanying diagrammatic drawings in which.

DESCRIPTION OF PREFERRED EMBODIMENTS

Figure 1:
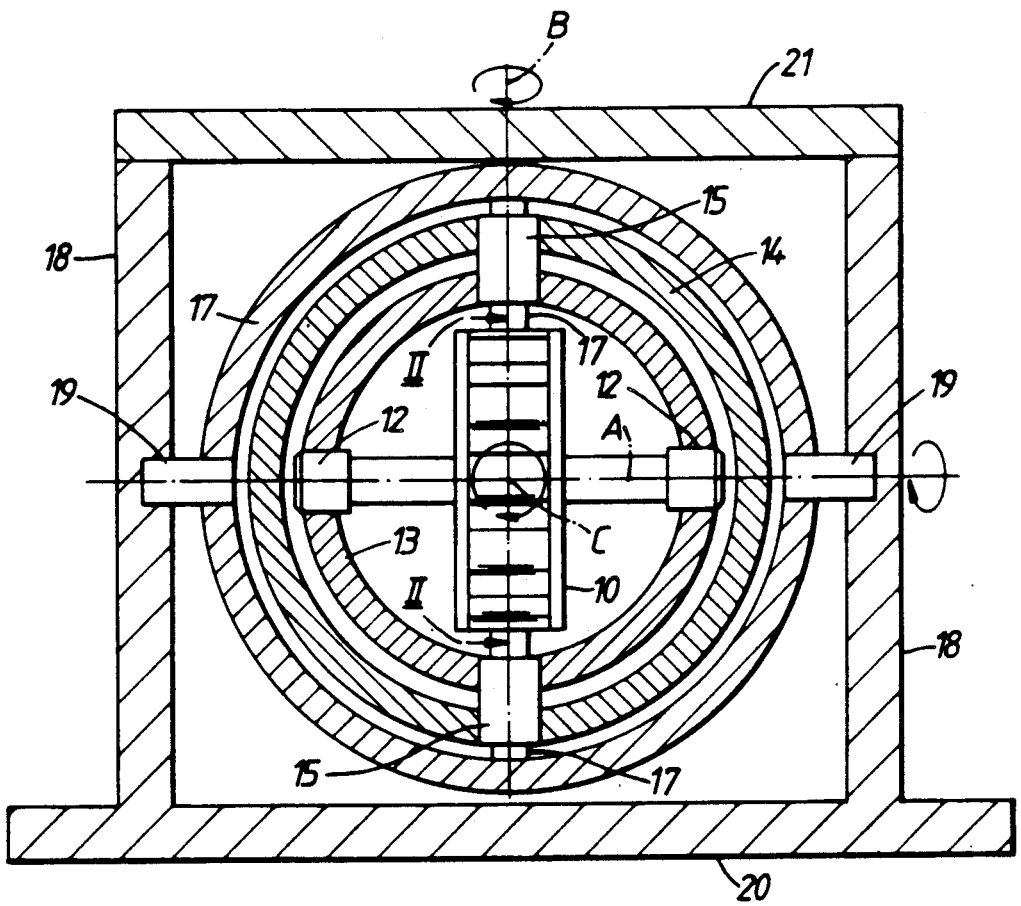
FIG. 1 is a diagrammatic, partly sectioned, end view of the gyroscope rotor assembly taken on line I—I of FIG. 3.

FIG. 1 shows a gyroscope rotor 10 mounted for rotation about an axis A in bearings 12 in a gimbal ring 13. Ring 13 is mounted for rotation, about an axis B, in a gimbal frame 14, by means of bearings 15. Gimbal frame 14 is mounted for rotation about an axis C by means of bearings (not shown) in a gimbal frame 17 which is itself mounted for rotation in side walls 18 by means of bearings in the side walls. Walls 18 are upstanding from a base 20 and support a cover 21. The mounting arrangement for the rotor, allowing it freedom of movement about three orthogonal axes, its conventional. The mounting arrangement for the rotor is purely diagrammatic and for the purpose of illustrating the operating principles to be described below.

In the specific example being considered, the gyroscope rotor is required to be placed into operation (that is, is required to be running at relatively high speed) in a relatively short period of time. This application therefore requires the rotor to be run up to high speed rapidly, from which speed it decelerates only slowly (because of its high inertia).

Figure 2:
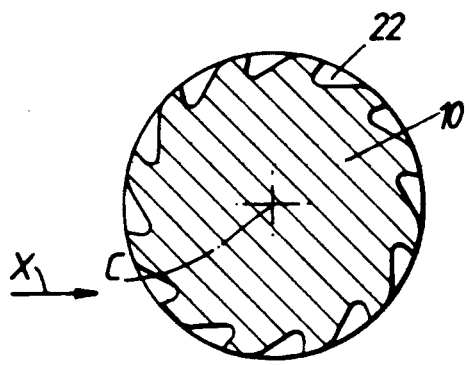
FIG. 2 is a cross-section on the line II—II of FIG. 1.

FIG. 2 illustrates the gyroscope rotor 10 in cross-section. As shown, it is formed with peripheral "buckets" 22.

Figure 3:
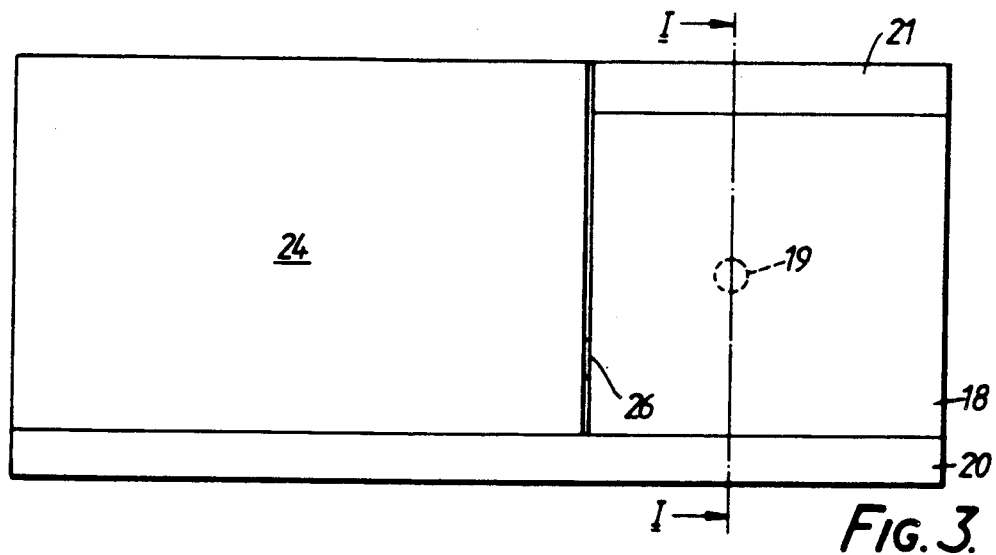
FIG. 3 is a diagrammatic side view of the gyroscope rotor assembly showing a motive power generating unit.

For the purpose of spinning the rotor up to speed, a motive power generating unit 24 is mounted adjacent to the rotor 10 as shown in FIG. 3. The unit 24 will be described in detail below. However, when activated, it produces a jet of gas which is emitted via a jet orifice 26 (FIG. 3) and strikes the periphery of the rotor 10 in approximately the direction of the arrow X of FIG. 2. The impinging jet of gas thus impinges in the buckets 22 and rapidly spins the rotor up to speed.

Figure 4:
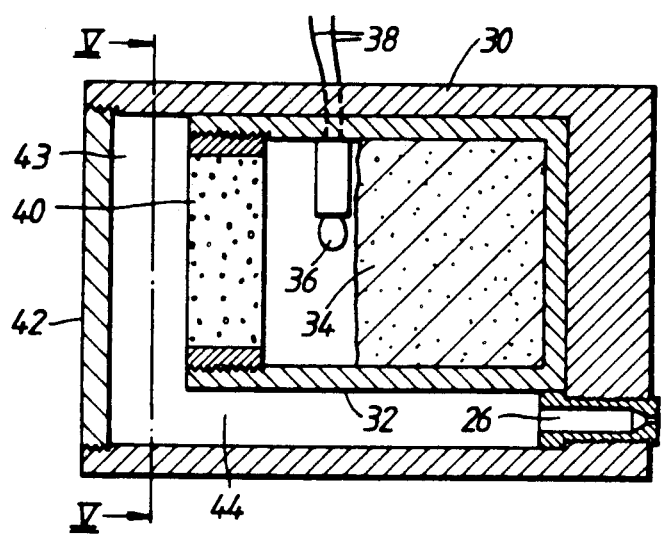
FIG. 4 is a cross-section through the motive power generating unit of FIG. 3, taken on the line IV—IV of FIG. 5.

As shown in FIG. 4, the unit 24 comprises an outer cylinder 30 in which is eccentrically mounted an inner cylinder 32. Cylinder 32 contains a pyrotechnic composition 34, to be described below, in its base. Adjacent the material 34 is mounted an electrically actuatable ignition arrangement 36 which is activated by electrical energisation of wires 38. A filter arrangement 40 is mounted in cylinder 32 next to the ignition unit 36.

The left hand end of the outer cylinder 30 is closed off by a cover 42 which thus covers the head space 43. The eccentric mounting of the cylinder 32 within the cylinder 30 provides a passageway 44 leading to the jet orifice 26.

In operation, electrical energisation of the wires 38 causes the ignition unit 36 to ignite the pyrotechnic composition 34. This burns rapidly and emits gas which passes through the filter arrangement 40, impinges on the underside of the cover 42 and passes down the passageway 44 and exits, in a jet, through the orifice 26—and then impinges on the periphery of the gyroscope rotor 10 in the manner already explained.

Figure 5:
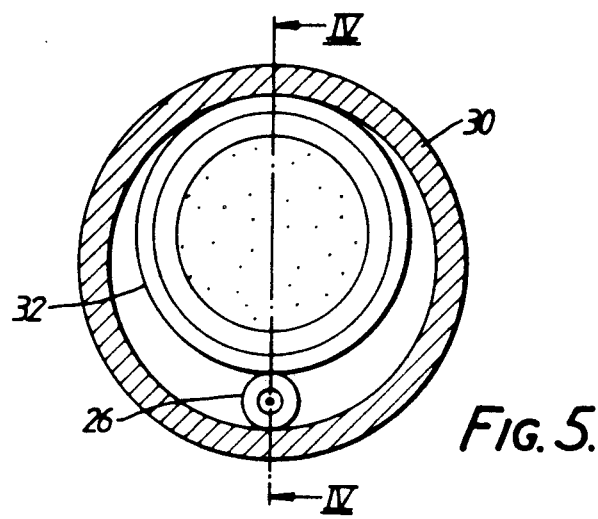
FIG. 5 is a cross-section on the line V—V of FIG. 4.
Figure 6:
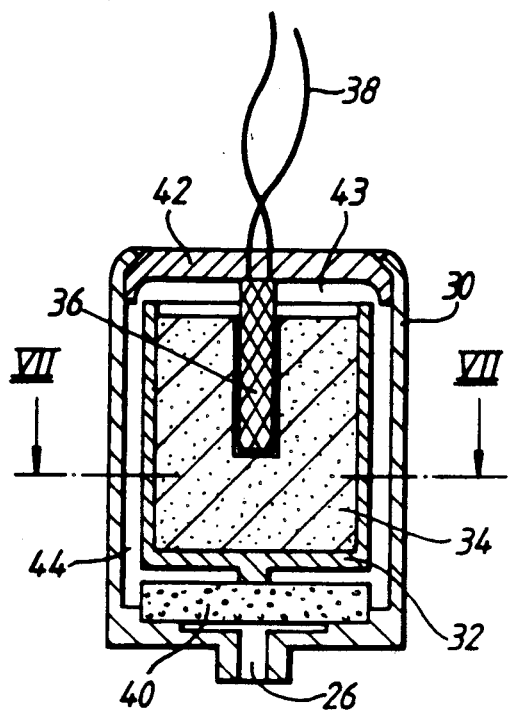
FIG. 6 a cross-section, on the line VI—VI of FIG. 7, through a modified form of the unit of FIGS. 4 and 5.
Figure 7:
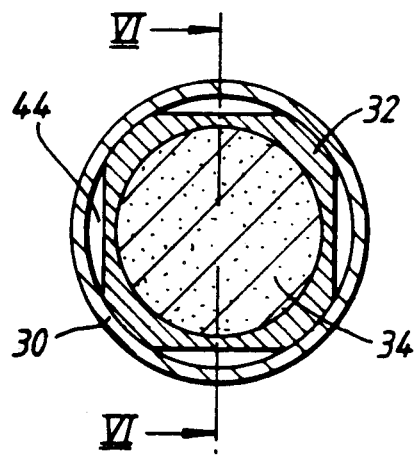
FIG. 7 is a cross-section on the line VII—VII of FIG. 6.

FIGS. 6 and 7 show a modified form of the unit 24 of FIGS. 4 and 5 and items in FIGS. 6 and 7 corresponding to those in FIGS. 4 and 5 are similarly referenced. In the unit of FIGS. 6 and 7, the cylinder 32 is concentrically rather than eccentrically mounted. When the ignition unit 36 is electrically energised, the pyrotechnic composition 34 emits gas which impacts on the underside of the cover 42 and passes along the concentric passageway 44 and thence through the filter 40 and emerges through the orifice 26.

The pyrotechnic composition 34 comprises an azide composition which thus generates nitrogen as the emitted gas.

Azide compositions which can be used comprise one or more alkali metal or alkaline earth metal azides, usually including sodium azide as a major component, together with an oxidising agent. When heated above 600

K sodium azide decomposes producing nitrogen gas and sodium metal:

$$2NaN_3 = 2Na + 3N_2$$

Because of the low melting point of sodium metal, its presence is undesirable from a safety viewpoint. Various substances, such as one or more metal oxides, particularly transition metal oxides or alkali metal perchlorates, have been proposed for use as the oxidising agent to be combined with the sodium azide in order to react with the sodium and produce inert compounds which will not contaminate the nitrogen. For example, the sodium azide may be combined with ferric oxide to produce a reaction as follows:

$$6NaN_3 + Fe_2O_3 = 2Fe + 3Na_2O + 9N_2$$

A doped ferric oxide may instead be used to produce a reaction similar to that referred to above.

Another possibility is to use chromium chloride producing a reaction as follows:

$$6NaN_3 + 2CrCl_3 = 2Cr + 6NaCl + 9N_2$$

Cobalt oxide may instead be used which produces a reaction as follows:

$$6NaN_3 + Co_2O_3 = 2Co + Na_2O + 9N_2$$

Another possibility is to use nickel oxide producing a reaction as follows:

$$4NaN_3 + 2NiO = 2Ni + 2Na_2O + 6N_2$$

Certain metal oxides are also added to the basic compositions in order to provide a flux which binds the residual solids together and reduces smoke formation. Typical of such additives are silica, titanium dioxide, aluminium oxide, and boric oxide. An example of such a composition is as follows:
  sodium azide 64%
  ferric oxide 26%
  silica 10%

Additives may also be incorporated in the composition for the purpose of producing a purer evolved gas. Thus, for example, the silica in the above composition may be replaced, in whole or in part, by powdered activated molecular sieve. Certain additional transition metal oxides may also be used for this purpose, e.g. $Cr_2O_3$, $Co_3O_4$, $Fe_3O_4$ and the like.

Binding agents may also be incorporated for the purpose of ensuring the integrity of the compressed composition, especially under conditions of high vibration. The range of binders known to those skilled in the art may be used, but those which have been found to be especially beneficial are the organic polymers, e.g. polysulphides, polyurethanes or polybutadienes, and the natural product derivatives comprising ethyl cellulose, gum arabic and shellac. Energetic binders may also be advantageously used such as nitrocellulose or collodion.

Figure 8:
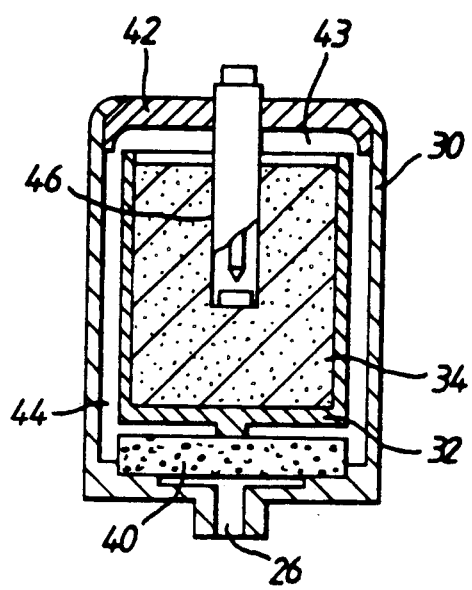
FIG. 8 corresponds to FIG. 6 but shows a further modification.

The material 34 may be activated by a percussion arrangement 46 (see FIG. 8) instead of by the electrical ignition arrangement 36 (of FIGS. 4 and 6), the percussion arrangement comprising a spring-loaded striker pin which, when released, is driven against a percussion cap or detonator.

The filter arrangement 40 can be of any suitable type but is designed to remove impurities or other substances which could be disadvantageous in various ways—such as, for example, by blocking the jet orifice 26. The filter can consist of a number of layers of metal gauzes or baffles or, for example, be a porous sintered metal filter. Further filtering action is obtained by the provision of the head space 43 above the filter 40 and by the arrangement by which the emitted gas impacts on the hard underside of the cover 42. Such impaction helps to separate out solid impurities. Instead of impacting the gas on the hard underside of the cover 42, the latter may be covered with a pad of compacted glass wool which retains the solid impurities.

Although the apparatus has been described for the purpose of spinning a gyroscope rotor up to speed, it will be appreciated that it could be modified for the purpose of providing motive power (not necessarily rotative) for any other suitable purpose.

The use of azide compositions for producing motive power in the manner described is advantageous over other gas sources. For example, gas sources comprising reservoirs storing gas under high pressure are large, heavy and susceptible to leakage and unsuitable for many purposes because of these reasons. The gas output which they produce has a gas velocity/time characteristic less suited to producing motive power than the gas produced by the azide compositions described above. Gas sources using double-based propellant materials, such as cordites, are disadvantageous for a number of reasons. The gas output of a cordite source is acrid and acidic and this is disadvantageous for many mechanical applications. For example, it may damage the bearings of gyroscope rotors. The chemical reaction taking place in cordite sources takes place partially in the gas phase. In other words, the gas is still burning when emitted. Its temperature may be damaging. Furthermore, in certain applications, the resultant infra-red "signature" of the emitted gas may be disadvantageous because it renders the presence of the gas source detectable by suitable infra-red detectors. The emitted gas is also toxic to humans which may be disadvantageous in certain circumstances.

What is claimed is:

1. Motive power generating apparatus, comprising:
   a pyrotechnic gas-generating substance in the form of an azide composition comprising a mixture of at least one of the alkaline metal and alkaline earth metal azides combined with an oxidising agent,
   activating means for igniting the composition,
   filtering means for filtering the generated gas,
   means responsive to the filtered gas for producing a jet of the gas acting in a predetermined direction, and
   mechanically movable means positioned to react movably to the jet of gas and to acquire and retain kinetic energy therefrom.

2. Apparatus according to claim 1, in which the filtering means comprises means for abruptly altering the direction of the generated gas by impacting it on a hard surface.

3. Apparatus according to claim 1, wherein the oxidising agent is selected from the group comprising metal oxides and alkaline metal perchlorates.

4. Apparatus according to claim 1, in which the azide is sodium azide.

5. Apparatus according to claim 1, in which the oxidising agent is a transition metal oxide.

6. Apparatus according to claim 5, in which the transition metal oxide is ferric oxide.

7. Apparatus according to claim 1, in which the composition further includes at least one of the group comprising silica, titanium oxide, boric oxide and aluminum oxide.

8. Apparatus according to claim 1, in which the gas generating composition is a mixture of sodium azide, ferric oxide and silica.

9. Apparatus according to claim 1, in which the activating means comprises percussion means.

10. Apparatus according to claim 1, in which the activating means comprises electrical ignition means.

11. Apparatus according to claim 1, in which the mechanically movable means is rotary means.

12. A gyroscope rotor assembly comprising:
a gyroscope rotor having its periphery formed with surface interruptions of predetermined form,
means mounting the rotor for rotation,
a container containing a pyrotechnic gas-generating azide composition comprising a mixture of at least one of the alkaline metal and alkaline earth metal azides combined with an oxidising agent,
activating means for activating the gas generating composition to generate nitrogen gas,
filtering means for filtering the generated gas, and
gas jet directing means for directing a jet of the filtered gas in such direction onto the surface interruptions in the periphery of the rotor as to rotate the rotor.

13. A method of generating motive power, comprising the steps of:
activating a pyrotechnic azide-containing gas-generating composition so as to generate nitrogen gas, said composition comprising a mixture of at least one of the alkaline metal and alkaline earth metal azides combined with an oxidising agent,
filtering the gas,
producing a jet of the generated gas, and
directing the gas in such direction in relation to a mechanically movable member as to cause, directly or indirectly, movement in the said member.

14. A method according to claim 13, in which the filtering step includes the step of abruptly altering the direction of the gas by impacting it on a hard surface.

15. A method according to claim 13, in which the gas directing step causes rotary movement.

* * * * *